US009726937B2

(12) United States Patent
Sumita et al.

(10) Patent No.: US 9,726,937 B2
(45) Date of Patent: Aug. 8, 2017

(54) DISPLAY DEVICE

(71) Applicant: Japan Display Inc., Tokyo (JP)

(72) Inventors: Shiro Sumita, Tokyo (JP); Hirohisa Miki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/680,183

(22) Filed: Apr. 7, 2015

(65) Prior Publication Data

US 2015/0286080 A1  Oct. 8, 2015

(30) Foreign Application Priority Data

Apr. 7, 2014  (JP) ................... 2014-078725

(51) Int. Cl.
*G02F 1/1339* (2006.01)
*B32B 3/30* (2006.01)
*B32B 7/14* (2006.01)
*B32B 27/08* (2006.01)

(52) U.S. Cl.
CPC ............. *G02F 1/1339* (2013.01); *B32B 3/30* (2013.01); *B32B 7/14* (2013.01); *B32B 27/08* (2013.01); *B32B 2457/202* (2013.01); *G02F 1/13394* (2013.01); *Y10T 428/24612* (2015.01)

(58) Field of Classification Search
CPC ..... G02F 1/1339; G02F 1/13394; B32B 3/30; B32B 7/14; B32B 2457/202; B32B 27/08; Y10T 428/24612
USPC ........................................ 349/153, 155, 156
See application file for complete search history.

(56) References Cited

U.S. PATENT DOCUMENTS

| 7,417,703 B2* | 8/2008 | Kim | G02F 1/1339 349/138 |
| 7,884,914 B2* | 2/2011 | Chen | H01L 51/5246 277/312 |
| 2005/0185128 A1* | 8/2005 | Yeh | G02F 1/1339 349/153 |
| 2010/0079718 A1* | 4/2010 | Sekiya | G02F 1/133512 349/153 |
| 2010/0149477 A1* | 6/2010 | Nagami | G02F 1/1339 349/138 |
| 2011/0122357 A1* | 5/2011 | Chang | G02F 1/133512 349/155 |
| 2015/0036093 A1* | 2/2015 | Matsuura | G02F 1/1339 349/153 |

FOREIGN PATENT DOCUMENTS

| JP | 2001-018367 A | 1/2001 |
| JP | 2013-003305 A | 1/2013 |

* cited by examiner

*Primary Examiner* — Edward Glick
*Assistant Examiner* — David Chung
(74) *Attorney, Agent, or Firm* — Typha IP LLC

(57) ABSTRACT

Recently, with an increasing demand for narrowing a frame, the seal line width is inclined to get finer, which deteriorates the seal adhesive strength. One or a plurality of grooves are formed in a resin layer that is a foundation of a seal area. A direction of forming a groove (lateral surface) is preferably in a vertical direction to the external stress. In a seal straight portion, a groove is preferably formed not only in a parallel direction to the seal but also in the vertical direction. In a seal corner portion, a groove is preferably formed in a shape curved convexly toward a direction of a display area (active area).

13 Claims, 14 Drawing Sheets

L1=500μm
L2=100μm
D2=100μm
D3=100μm
D4=100μm
Wb=50μm

DISPLAY DEVICE

CLAIM OF PRIORITY

The present application claims priority from Japanese patent application JP2014-078725 filed on Apr. 7, 2014, the content of which is hereby incorporated by reference into this application.

BACKGROUND

This disclosure relates to a display device and is applicable to, for example, a display device including a resin layer in a foundation of a seal area.

Although a liquid crystal display panel holds liquid crystals between two upper and lower substrates, the upper and lower substrates are stuck and bonded together, to form cells, and a seal material is arranged around the substrates, to seal the liquid crystals within the cells (for example, Japanese Patent Publication Laid-Open No. 2013-3305).

SUMMARY

Recently, with an increasing demand for narrowing a frame, a seal line width is inclined to get finer, which deteriorates the seal adhesive strength.

Other problems and new features will be apparent from the description of the disclosure and the attached drawings. Of the disclosure, the outline of the typical one will be briefly described as follows.

In short, a display device has a first substrate including a resin layer, a second substrate, and a seal area for arranging a sealing material of sticking the first substrate and the second substrate. The seal area is arranged around the outer periphery of the first substrate. The resin layer includes a first groove in an area overlapping with the seal area and a second groove arranged at the outer peripheral side from the first groove. Each longitudinal direction of the first groove and the second groove is in parallel to the outer periphery.

DESCRIPTION OF THE PREFERRED EMBODIMENTS

Figure 1A:
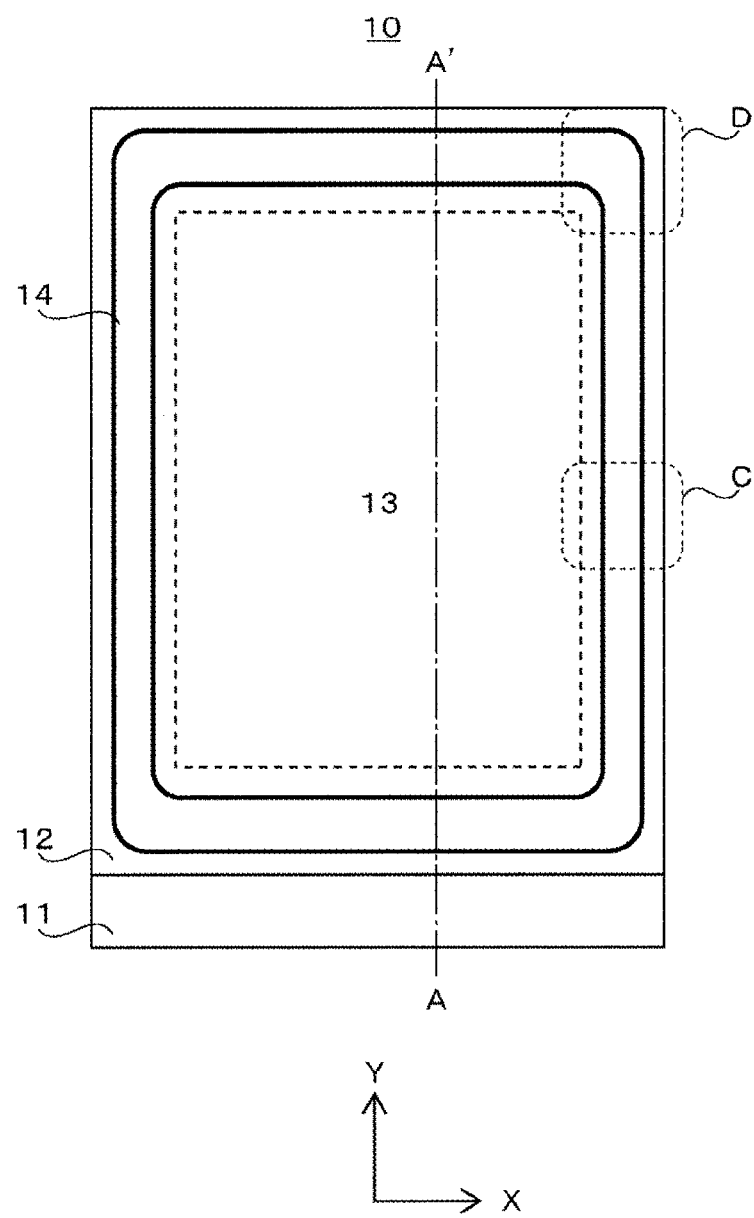
FIG. 1A is a top plan view showing the structure of a display device according to the embodiments.

In order to keep a constant gap between the substrates of a display panel, column spacers are formed on either the upper or the lower glass substrate (opposite substrate or array substrate) according to the photolithography technique. The column spacers are formed not only in a display area of the display panel but also in a seal forming area. In order to reduce the number of the processes as possible, the spacers for both the display area and the seal forming area are generally formed at once in the same process. The column spacers having the same height are formed in the both areas; therefore, in order to equally keep the cell gap of the display panel both in the display area and the seal forming area, the layer structure that is a foundation of the column spacers has to be as even as possible both in the display area and the seal forming area.

For improvement in aperture ratio in the display area of the display panel, leveling of a step, and insulation between conductive layers, a resin layer with a thickness of several μm is formed in the display area, and the same resin layer is formed also in the seal forming area. Further, the resin layer also works as a protective film of wiring (prevention of flaw caused by mechanical contact, prevention of corrosion caused by water, and prevention of entry of static electricity) in the peripheral area including a seal.

With a further increasing demand for narrowing a frame, the seal width is supposed to be narrower from the current width of 0.6 to 0.9 mm to 0.2 mm. Various loads are imposed on the display panel, especially in the vicinity of each edge, during the cutting process after the process for sticking the array substrate and the opposite substrate and the mounting process of a semiconductor integrated circuit (IC chip) and a flexible wiring substrate, which makes the seal peel off easily.

Further, that may make water easily intrude into the display panel from the outside, which may spoil the reliability.

Furthermore, under the present circumstances, coating of a sealing material is generally achieved by using a dispenser; however, according to the narrowing of a line, the seal coating amount is getting less, and as the result, variation in the coating amount gets greater with respect to the line width ratio, which makes the line width unstable.

In order to solve the above problems, from the viewpoint of the sealing strength, one or a plurality of groves are formed in the resin layer that is a foundation of the seal area. The direction of forming a groove (lateral surface) is preferably in a direction vertical to an external stress. In the seal straight portion, a groove is preferably formed not only in a parallel direction but also in a vertical direction to the seal. In the seal corner portion, a groove is preferably formed in a shape convexly curved toward a direction of a display area (active area). The resin layer includes, for example, an organic insulating film such as a flattening film and may include an alignment film.

From the viewpoint of diminishing the water intrusion, considering that water often intrudes from the boundary of each layer formed on the substrate surface, roughness is preferably formed on the boundary as much as possible in order to make the intrusion path long. In this sense, the structure of forming a plurality of grooves is preferable.

Further, from the viewpoint of stabilizing the seal line width, since the column spacers are formed in a convex portion of the resin layer (not the position of a groove), the groove is not directly related to the gap formation; according as the area of the groove is larger, the seal coating amount gets more and the seal gets more stable. Generally, considering that the seal height and the resin layer film thickness are both several μm, an increase in the coating amount due to the formation of the groove is much effective.

Further, because of the formation of the groove, there is a fear that a possible area to set the column spacers may be restricted in the resin layer corresponding to the seal area; however, considering that the column spacers each having a width of dozens of μm are formed, with the seal width of about 0.2 mm, even if a narrow frame structure, the column spacers can be set without difficulty.

Differently from the groove formed in parallel to the seal, when a groove is formed in a vertical direction, the capacity of the groove per seal unit length becomes various depending on the seal forming position and the seal storing capacity becomes various, thereby causing a fear of hardly stabilizing the seal line width. In order to cope with this problem, when forming the column spacers according to the photolithography, a dummy column spacer is provided also in the groove of the resin layer, hence to be able to relieve the variation of the seal storing capacity.

Although the above has been described with respect to the resin layer formed on the array substrate, the same effect can be expected on the structure of forming a groove in a black matrix layer, a flattening film, R (red), G (green), and B (blue) layers of a color filter that are the foundation of the seal forming area, on the opposite substrate.

Hereinafter, embodiments and modified example will be described with reference to the drawings. The disclosure is only one example, and various modifications within the spirit of the invention that could be easily arrived at by those skilled in the art are to be included in the scope of the invention. To make the description clearer, the drawings are illustrated schematically in width, thickness, and shape of each unit, differently from the actual modes; the drawings are only one example and not to intend to restrict the interpretation of the invention. In the specification and the drawings, the same reference numerals are attached to the same elements that have been already described in the previous drawing and their description will be properly omitted.

Embodiments

The structure of a display device according to the embodiments will be described using FIGS. 1A and 1B.

FIG. 1A is a top plan view showing the structure of a display device according to the embodiments. FIG. 1B is a cross sectional view taken along the line A-A' in FIG. 1A.

Figure 1B:
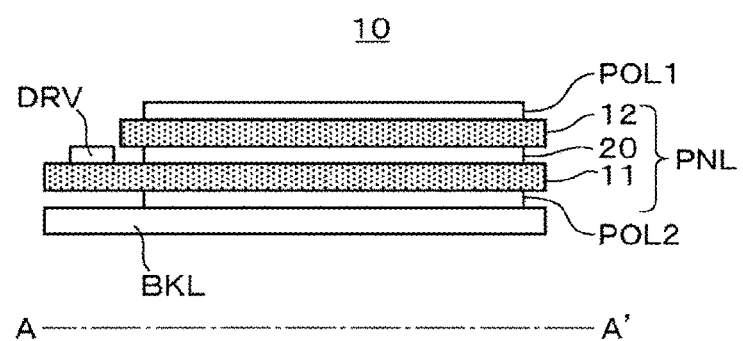
FIG. 1B is a cross sectional view taken along the line A-A' of FIG. 1A.

As illustrated in FIG. 1B, a display device 10 includes a display panel PNL, a semiconductor integrated circuit DRV, and a backlight BKL. The display panel PNL includes a TFT substrate (array substrate, first substrate or second substrate) 11, a liquid crystal layer 20, a CF substrate (opposite substrate, first substrate or second substrate) 12, and polarizing plates POL1 and POL2.

As illustrated in FIG. 1A, the array substrate 11 and the opposite substrate 12 are rectangular on a plan view, each having four sides. Video signal lines and scanning lines driven by the semiconductor integrated circuit DRV, pixel electrodes, and thin film transistors (TFT) are formed in an active area 13 of the array substrate 11 surrounded by a dotted line. In the opposite substrate 12, at a position corresponding to each pixel electrode of the array substrate 11, a color filter is formed. As illustrated in FIG. 1A, a seal forming area 14 for sticking the array substrate 11 and the opposite substrate 12 is positioned outside of the active area 13 and arranged along the outer periphery of the array substrate 11 and the opposite substrate 12. The seal area 14 includes a straight portion indicated by a dotted line C and a corner portion indicated by a dotted line D of FIG. 1A.

Sealing strength is examined in various shapes of grooves (patterns) formed in the resin layer corresponding to the seal forming area 14.

<Pattern 1>

At first, a first pattern (pattern 1) will be described with reference to FIGS. 2A to 3C.

Figure 2A:
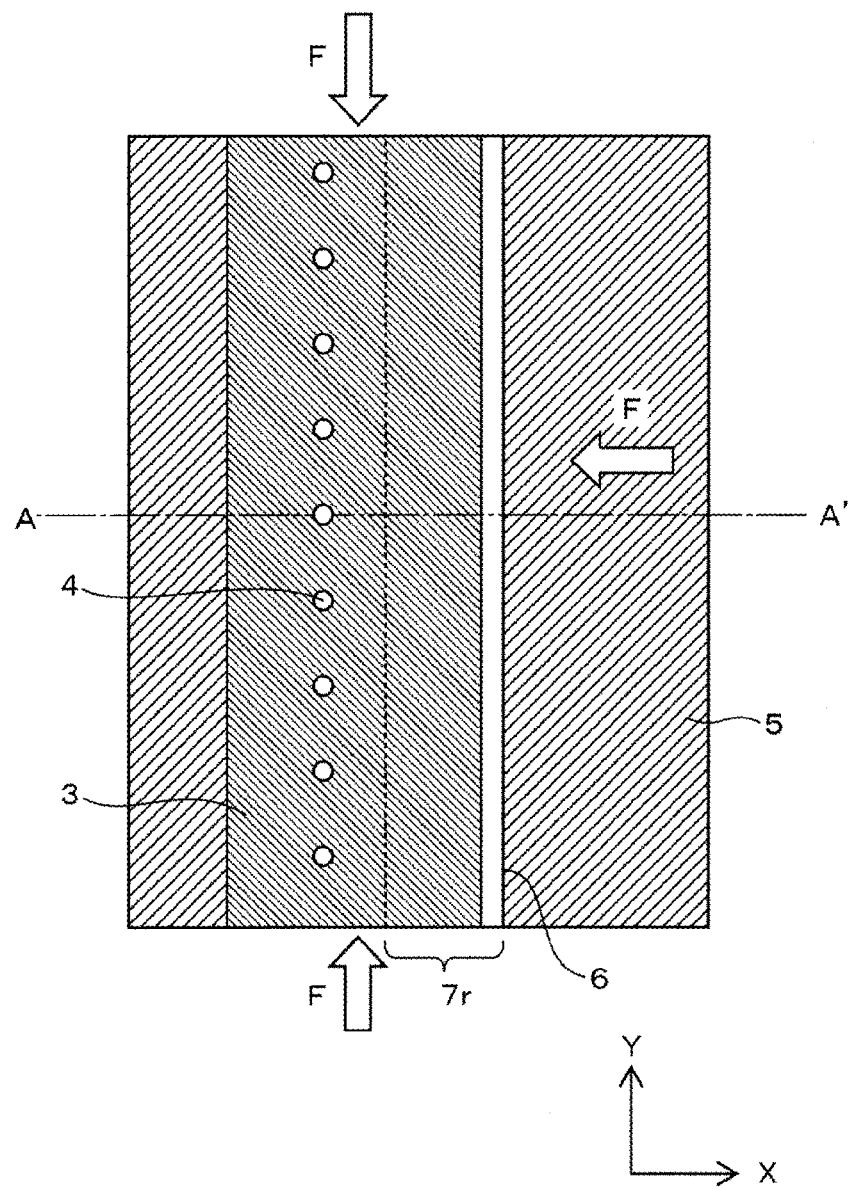
FIG. 2A is a top plan view of a portion indicated by a dotted line C of FIG. 1A in a display device according to a pattern 1.
Figure 2B:
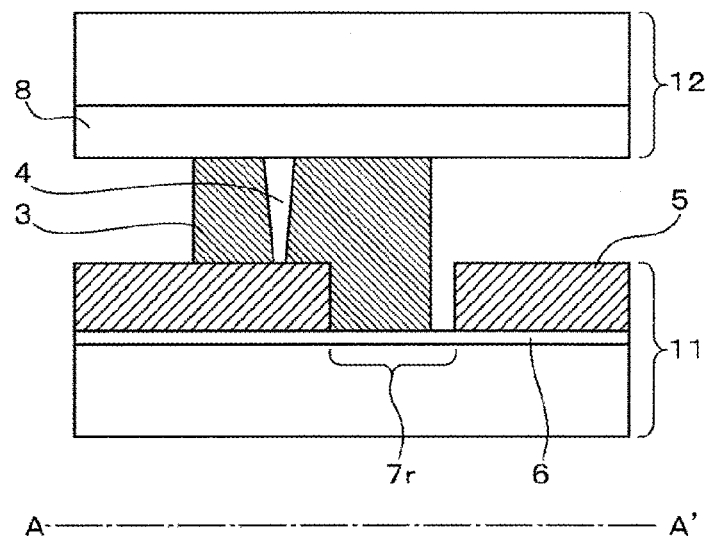
FIG. 2B is a cross sectional view taken along the line A-A' of FIG. 2A.
Figure 2C:
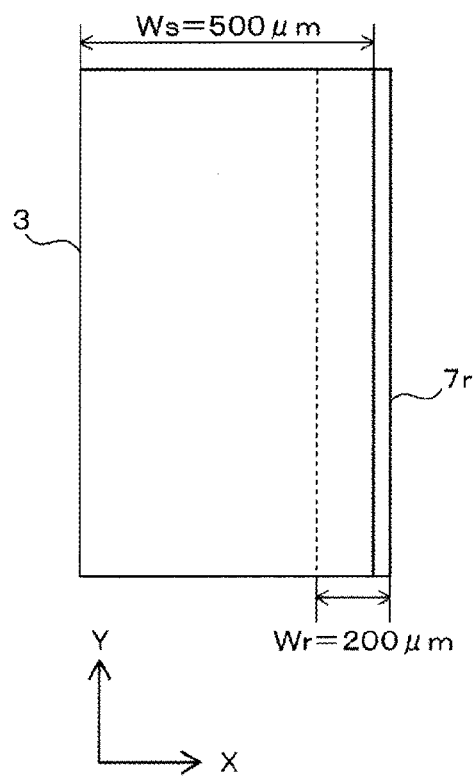
FIG. 2C is a view showing the pattern measurement in a seal straight portion.
Figure 3A:
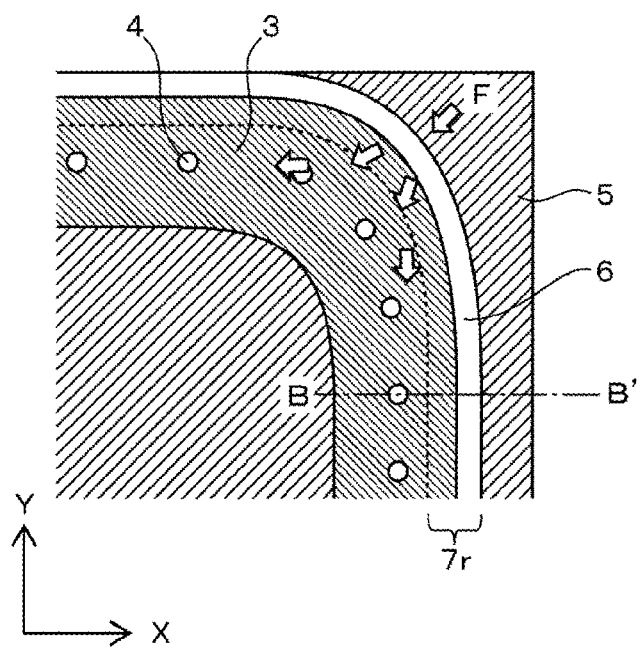
FIG. 3A is a top plan view of a portion indicated by a dotted line D of FIG. 1A in the display device according to the pattern 1.
Figure 3B:
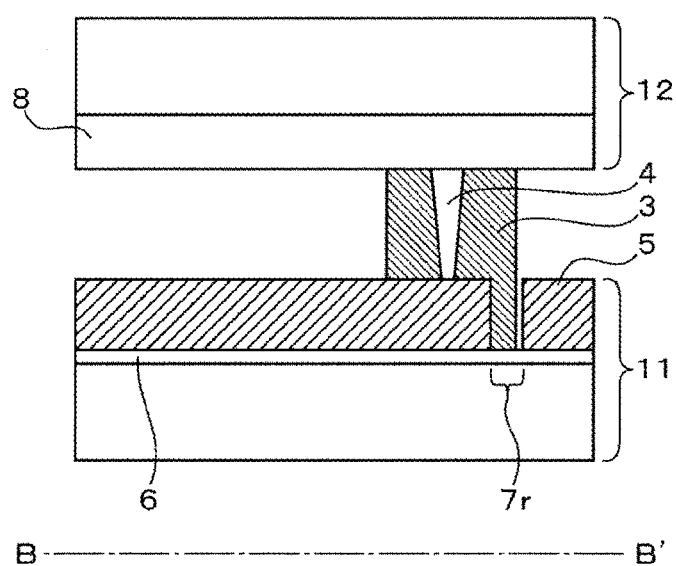
FIG. 3B is a cross sectional view taken along the line B-B' of FIG. 3A.
Figure 3C:
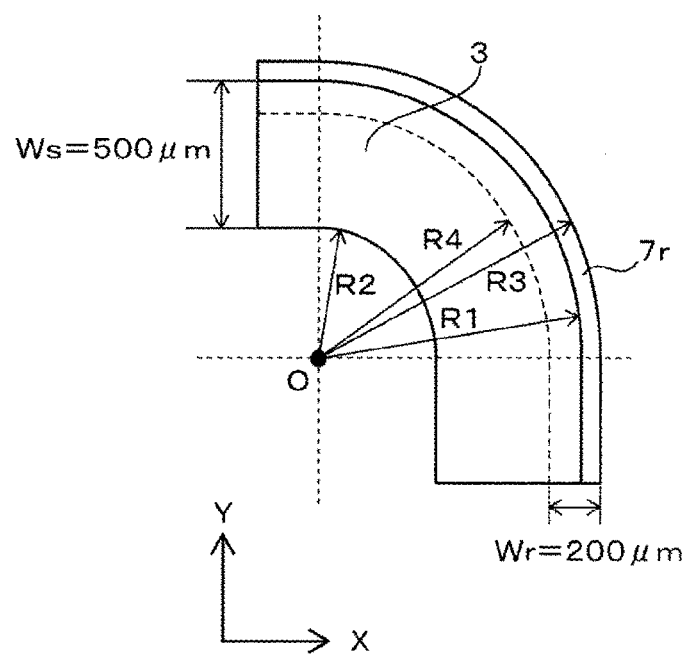
FIG. 3C is a view showing the pattern measurement in a seal corner portion.

FIG. 2A is a top plan view of a portion indicated by the dotted line C of FIG. 1A in a display device according to a pattern 1. FIG. 2B is a cross sectional view taken along the line A-A' of FIG. 2A. FIG. 2C is a view showing the pattern measurement in the seal straight portion. FIG. 3A is a top plan view of a portion indicated by the dotted line D of FIG. 1A in the display device according to the pattern 1. FIG. 3B is a cross sectional view taken along the line B-B' of FIG. 3A. FIG. 3C is the pattern measurement in the seal corner portion.

As illustrated in FIGS. 2B and 3B, an inorganic insulating layer 6 made of silicon nitride film is formed on the array substrate 11 and a resin layer 5 made of flattening film is formed thereon. On the opposite substrate 12, a black matrix layer 8 is formed and column spacers 4 are formed thereon. In some cases, a color filter layer and a flattening film are formed on the black matrix layer; here, they are all inclusively referred to as the black matrix layer 8. The array substrate 11 and the opposite substrate 12 are stuck together with a seal 3. As illustrated in FIGS. 2A and 3A, one groove 7r is formed in the resin layer 5 around the outer periphery of the seal 3 (seal forming area 14) and the seal 3 gets into the groove 7r in a way of increasing the sealing strength.

In the forming process of the array substrate 2, coating of the resin layer 5 and pattern formation (that is, coating of the resin layer 5, UV exposure through a mask, development, and thermosetting) is achieved, and a mask having a pattern as illustrated in FIGS. 2C and 3C is prepared as a mask for use in the UV exposure, to form a groove. Hereinafter, this is the same also in a pattern 2 and a pattern 3.

As illustrated in FIG. 2C, in a pattern 1-S in the seal straight portion, the longitudinal direction (Y direction) of the seal 3 agrees with the longitudinal direction of the groove 7r and the seal 3 overlaps with a part of the groove 7r. The width (Ws) of the seal 3 is 500 μm and the width (Wr) of the groove 7r is 200 μm.

As illustrated in FIG. 3C, in a pattern 1-C in the seal corner portion, the circumferential direction of the seal 3 agrees with the circumferential direction of the groove 7r and the seal 3 overlaps with a part of the groove 7r. The width (Ws) of the seal 3 is 500 μm and the width (Wr) of the groove 7r is 200 μm. The seal 3 is positioned between an arc with a first radius (R1) and an arc with a second radius (R2) from the center (O). Here, R1=1000 μm and R2=500 μm. Ws=R1−R2. The groove 7r is positioned also between an arc with a third radius (R3) and an arc with a fourth radius (R4) from the center (O). Wr=R3−R4.

<Pattern 2>

A second pattern (pattern 2) will be described with reference to FIGS. 4A to 4C.

Figure 4A:
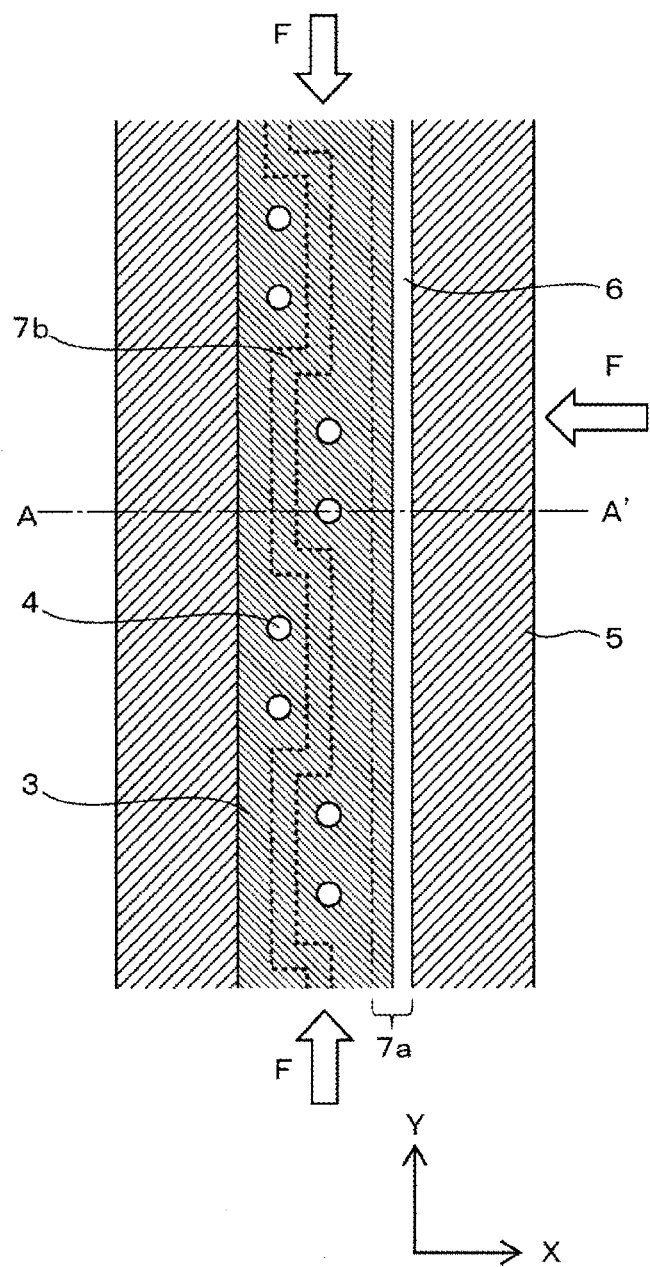
FIG. 4A is a top plan view of the portion indicated by the dotted line C of FIG. 1A in a display device according to a pattern 2.

FIG. 4A is a top plan view of the portion indicated by the dotted line C of FIG. 1A in a display device according to the pattern 2. FIG. 4B is a cross sectional view taken along the line A-A' of FIG. 4A. FIG. 4C is a view showing the pattern measurement.

Figure 4B:
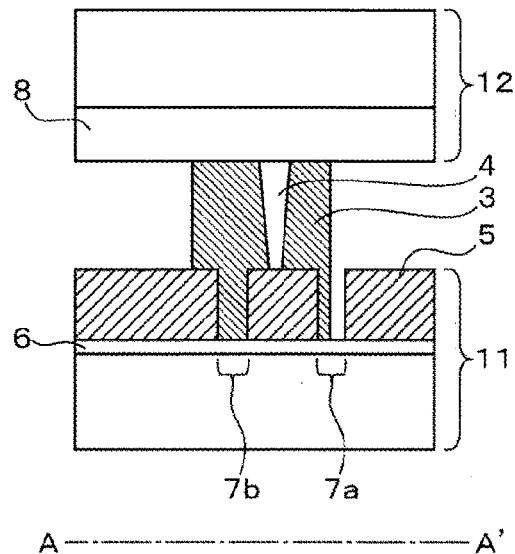
FIG. 4B is a cross sectional view taken along the line A-A' of FIG. 4A.

As illustrated in FIGS. 4A and 4B, the inorganic insulating layer 6 is formed on the array substrate 11 and the resin layer 5 is formed thereon. Further, the black matrix layer 8 is formed on the opposite substrate 12 and the column spacers 4 are formed thereon. The array substrate 11 and the opposite substrate 12 are stuck together with the seal 3. A groove (first groove) 7b is formed in the resin layer 5 overlapping with the seal 3 (seal area 14) and a groove (second groove) 7a is formed around the outer periphery of the seal 3 (seal forming area 14). The seal 3 gets into the grooves 7a and 7b in a way of increasing the sealing strength.

Figure 4C:
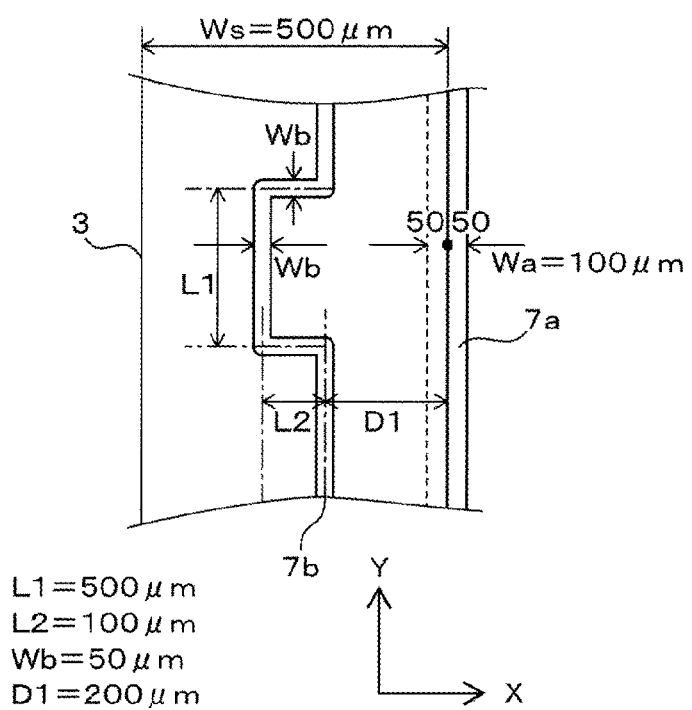
FIG. 4C is a view showing the pattern measurement in the seal straight portion.

As illustrated in FIG. 4C, a pattern 2-S in the seal straight portion includes a crank shaped groove 7b, in addition to the groove 7a similar to the groove 7r of the pattern 1-S, at a position overlapping with the seal 3. The longitudinal direction (Y direction) of the seal 3 agrees with the longitudinal direction of the groove 7a and the seal 3 overlaps with a part of the groove 7a. The width (Ws) of the seal 3 is 500 μm and the width (Wa) of the groove 7a is 100 μm. The edge of the seal 3 is positioned at the center line of the groove 7a. The groove 7b includes a first line segment in a parallel direction to the seal 3 (Y direction or longitudinal direction) and a second line segment in a vertical direction to the seal 3 (X direction). The width (Wb) of the groove 7b is 50 μm, the length (L1) of the first line segment is 500 μm, and the length (L2) of the second line segment is 100 μm. The distance (D1) from the center line of the groove 7a to the center line of the groove 7b positioned at the nearest side to the groove 7a is 200 μm.

<Pattern 3>

A third pattern (pattern 3) will be described with reference to FIGS. 5A to 5C.

Figure 5A:
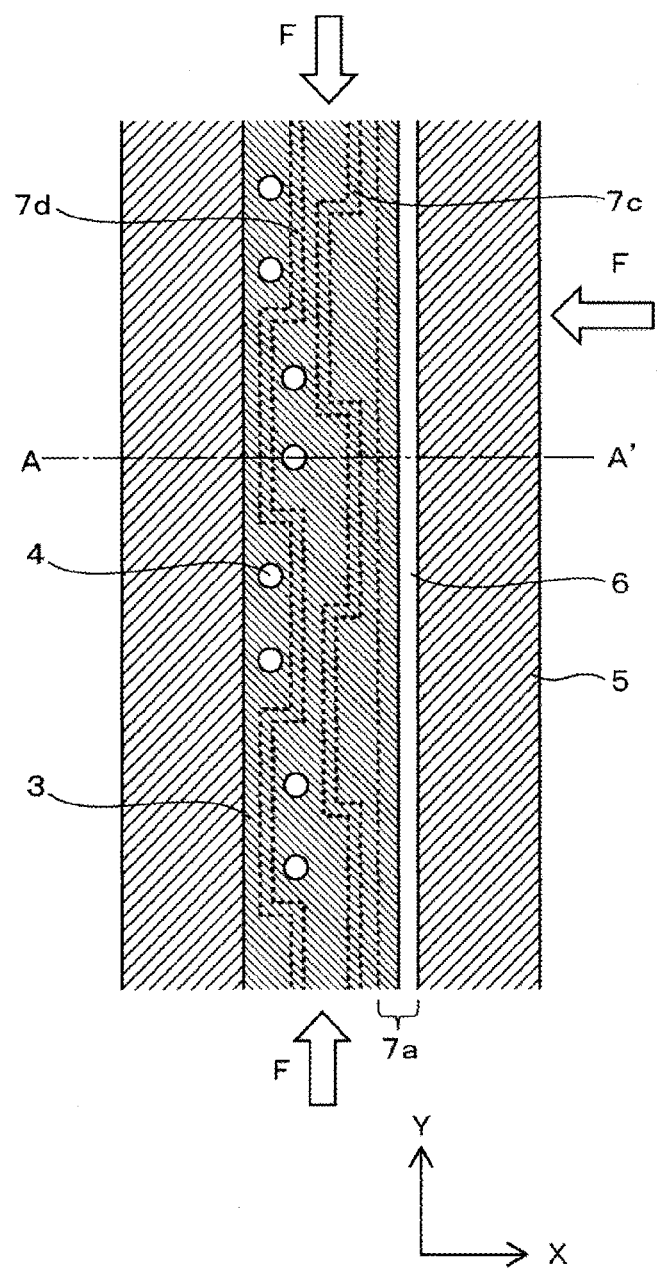
FIG. 5A is a top plan view of the portion indicated by the dotted line C of FIG. 1A in a display device according to a pattern 3.

FIG. 5A is a top plan view of the portion indicated by the dotted line C of FIG. 1A in a display device according to the pattern 3. FIG. 5B is a cross sectional view taken along the line A-A' of FIG. 5A. FIG. 5C is a view showing the pattern measurement.

Figure 5B:
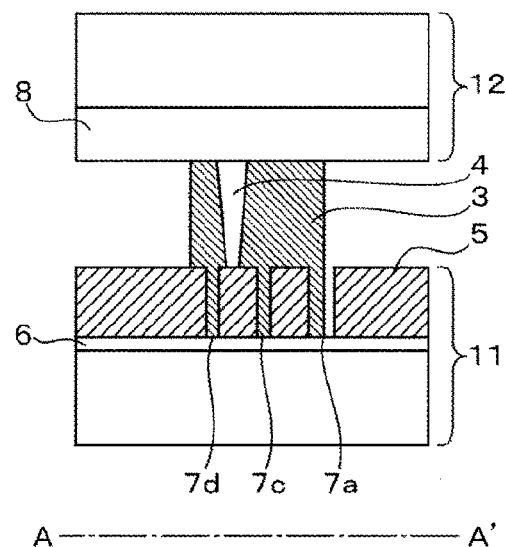
FIG. 5B is a cross sectional view taken along the line A-A' of FIG. 5A.

As illustrated in FIGS. 5A and 5B, the inorganic insulating layer 6 is formed on the array substrate 11 and the resin layer 5 is formed thereon. Further, the black matrix layer 8 is formed on the opposite substrate 12 and the column spacers 4 are formed thereon. The array substrate 11 and the opposite substrate 12 are stuck together with the seal 3. A groove (third groove) 7c and a groove (first groove) 7d are formed in the resin layer 5 overlapping with the seal 3 (seal area 14) and the groove (second groove) 7a is formed around the outer periphery of the seal 3 (seal forming area 14). The seal 3 gets into the grooves 7a, 7c, and 7d in a way of increasing the sealing strength.

Figure 5C:
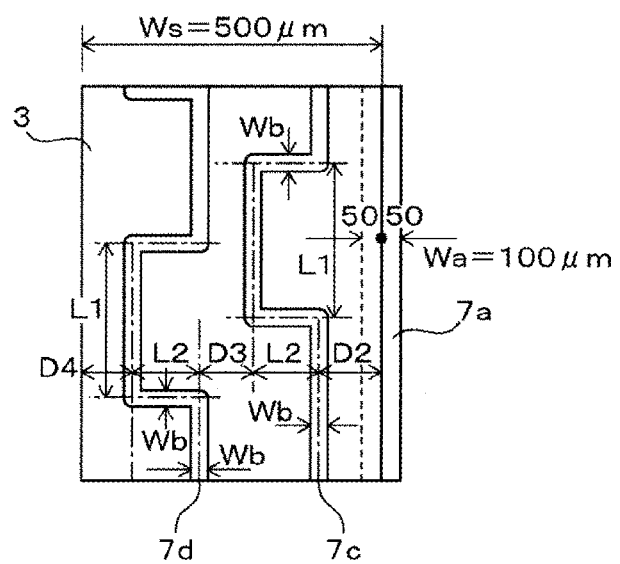
FIG. 5C is a view showing the pattern measurement in the seal straight portion.

As illustrated in FIG. 5C, a pattern 3-S in the seal straight portion includes the crank shaped grooves 7c and 7d similar to the groove 7b of the pattern 2-S at a position overlapping with the seal 3, in addition to the same groove 7a as in the pattern 2-S. The longitudinal direction (Y direction) of the seal 3 agrees with the longitudinal direction of the groove 7a and the seal 3 overlaps with a part of the groove 7a. The width (Ws) of the seal 3 is 500 μm and the width (Wa) of the groove 7a is 100 μm. The edge of the seal 3 is positioned at the center line of the groove 7a. The groove 7c includes a first line segment in a parallel direction to the seal 3 (Y direction or longitudinal direction) and a second line segment in a vertical direction to the seal 3 (X direction). The width (Wb) of the groove 7c is 50 μm, the length (L1) of the first line segment is 500 μm, and the length (L2) of the second line segment is 100 μm. The groove 7d includes a first line segment in a parallel direction to the seal 3 (Y direction or longitudinal direction) and a second line segment in a vertical direction to the seal 3 (X direction). The width (Wb) of the groove 7d is 50 μm, the length (L1) of the first line segment is 500 μm, and the length (L2) of the second line segment is 100 μm. The distance (D2) from the center line of the groove 7a to the center line of the groove 7c positioned at the nearest side to the groove 7a is 100 μm. The distance (D3) from the center line of the groove 7c positioned at the nearest side to the groove 7d to the center line of the groove 7d positioned at the nearest side to the groove 7c is 100 μm. The distance (D4) from the left edge of the seal 3 to the center line of the groove 7d positioned at the leftmost side of the seal 3 is 100 μm.

<Pattern 4>

A fourth pattern (pattern 4) will be described with reference to FIGS. 6A to 6C.

Figure 6A:
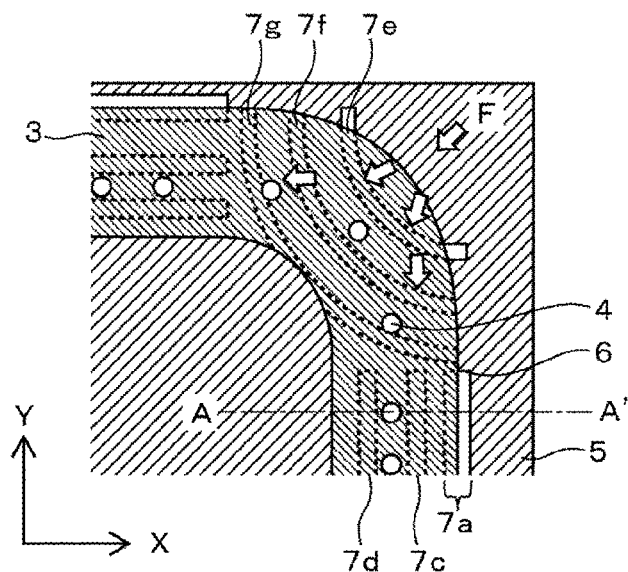
FIG. 6A is a top plan view of the portion indicated by the dotted line D of FIG. 1A in a display device according to a pattern 4.

FIG. 6A is a top plan view of the portion indicated by the dotted line D of FIG. 1A in a display device according to the pattern 4. FIG. 6B is a cross sectional view taken along the line A-A' of FIG. 6A. FIG. 6C is a view showing the pattern measurement.

Figure 6B:
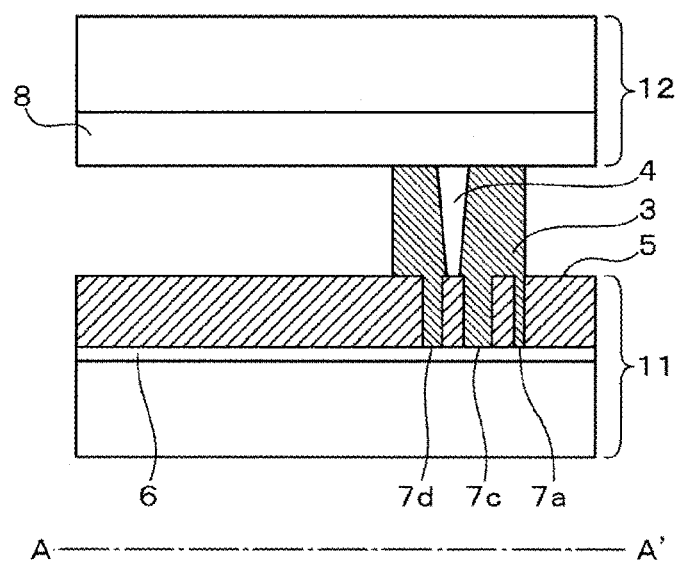
FIG. 6B is a cross sectional view taken along the line A-A' of FIG. 6A.

As illustrated in FIGS. 6A and 6B, the inorganic insulating layer 6 is formed on the array substrate 11 and the resin layer 5 is formed thereon. Further, the black matrix layer 8 is formed on the opposite substrate 12 and the column spacers 4 are formed thereon. The array substrate 11 and the opposite substrate 12 are stuck together with the seal 3. Grooves 7a, 7c, and 7d are formed in the seal straight portion of the resin layer 5 overlapping with the seal 3 (seal area 14), grooves (fourth grooves) 7e, 7f, and 7g are formed in the seal corner portion thereof, and the seal 3 gets into the grooves 7a, 7c, 7d, 7e, 7f, and 7g in a way of increasing the sealing strength.

Figure 6C:
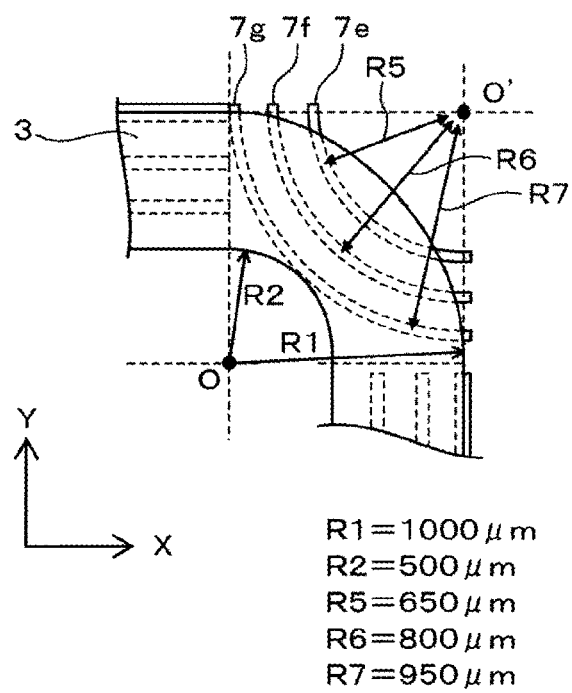
FIG. 6C is a view showing the pattern measurement in the seal corner portion.

As illustrated in FIG. 6C, a pattern 4-C in the seal corner portion has three grooves 7e, 7f, and 7g in a circumferential direction opposite to the circumferential direction of the seal 3 and the seal 3 overlaps with a part of the grooves 7e, 7f, and 7g. The width (Ws) of the seal 3 is 500 μm and each width (Wc) of the grooves 7e, 7f, and 7g is 50 μm. The seal 3 is arranged between an arc with a first radius (R1) from the center (O) and an arc with a second radius (R2) from the center (O). Here, R1=1000 μm, R2=500 μm. WS=R1−R2. The respective grooves 7e, 7f, and 7g are respectively formed in an arc with a fifth radius (R5), an arc with a sixth radius (R6), and an arc with a seventh radius (R7) from the center (o'). R5=650 μm, R6=800 μm, and R7=950 μm.

<Pattern in Seal Straight Portion>

There will be examined the sealing strength against a stress working in a direction of peeling off the seal of a display panel made by sticking the array substrate 11 and the opposite substrate 12, in the case where the resin layer 5 having a thickness of 2 μm is arranged in the array substrate 11 by using three types of UV masks of the pattern 1-S, pattern 2-S, and pattern 3-S.

Generally, the area of a boundary in a vertical direction to a stress, which is imposed in a direction of peeling off the seal, is helpful to increase the sealing strength against the above stress.

When a stress is imposed in a direction (X direction) vertical to the longitudinal direction (Y direction) of the seal, the area of the boundary per unit length in the vertical direction to the stress is as follows: 2000 μm²/seal 1 mm (1000×2) in the pattern 1-S, 6000 μm²/seal 1 mm (3×1000×2) in the pattern 2-S, and 10000 μm²/seal 1 mm (5×1000×2) in the pattern 3-S. According to an increase in the number of the grooves in the resin layer 5, the number of the boundaries increases and the area of the boundaries per unit length in the vertical direction to the stress increases. When the area of the boundaries per unit length in the vertical direction to the stress increases, the sealing strength increases. Even when there is not provided with a groove in a direction vertical to the seal longitudinal direction, differently from the pattern 2-S and the pattern 3-S, the sealing strength increases.

On the other hand, when a stress is imposed in a direction (Y direction) parallel to the longitudinal direction (Y direction) of the seal, the area of the boundary in the vertical direction to the stress is as follows: 0 μm²/seal 1 mm in the pattern 1-S, 600 μm²/seal 1 mm (4×75×2) in the pattern 2-S, and 1200 μm²/seal 1 mm (8×75×2) in the pattern 3-S. When the groove is provided in the resin layer 5 also in the vertical direction (X direction) to the seal longitudinal direction (Y direction), the area of the boundary per unit length in the vertical direction to the stress increases. When the area of the boundary per unit length in the vertical direction to the stress increases, the sealing strength increases. As indicated by the arrow F in FIGS. 2A, 4A, and 5A, a stress of externally peeling off is imposed in the straight portion of the seal, in a long side direction (Y direction) or a short side direction (X direction) of the display panel, in other words, in the parallel direction (Y direction) to the longitudinal direction of the seal or the vertical direction (X direction). Therefore, a groove is preferably formed also in the vertical direction, in addition to the parallel direction to the seal longitudinal direction.

As mentioned above, in the seal straight portion, by increasing the number of the grooves, seal adhesive strength is improved, and further, it is expected that by an increase of the boundary, water intrusion amount from the outside can be decreased and that the seal line width can be stable because the groove serves as a buffer capacity.

Although each of two or three grooves provided in the seal area is uninterrupted in the embodiments, the groove may be not uninterrupted but partially interrupted. Various circuits and wirings are sometimes provided in the underlayer of the resin layer in the seal area and further wirings are provided also in the upper layer in some cases. In this case, when a groove is formed in the resin layer carelessly, the upper or lower wirings or circuits may be conducted and in such a case, a groove is not necessarily uninterrupted.

<Pattern in Seal Corner Portion>

Similarly, in the seal corner portion, a groove is preferably formed in the resin layer 5 on the array substrate 11 in the vertical direction to the direction of peeling off the seal. Generally, a stress of peeling off the seal at the angle of 45° from the corner of a display panel PNL toward the inner side (center portion) of the display panel PNL is imposed in the seal corner portion and according to the deeper position in the display panel PNL, the stress is much more resolved to a force parallel to the long side and a force parallel to the short side of the display panel PNL.

In the pattern 1-C, the groove 7r is formed in parallel to the seal 3 and the arc of the groove 7r is formed in parallel to the arc of the seal 3 also in the seal corner portion; as illustrated in FIG. 3A, in the inner position of the display panel PNL from the corner, the groove boundary and the stress direction are getting in parallel. The groove boundary is vertical to the stress direction in the middle and according to apart from the center, the both are getting in parallel and just in the seal straight portion, they are completely in parallel.

In the pattern 4-C, the groove of the resin layer 5 is formed into an arc shape with the center put outside of the seal 3 in a way of forming its boundary in the vertical direction to the stress direction as possible. In other words, the groove is provided in an area overlapping with the curved area of the seal 3. The groove is formed in a shape convexly curved toward the center portion of the display panel PNL (array substrate 11). Although three grooves 7e, 7f, and 7g are provided in the pattern 4-C, one or two grooves may be provided.

As mentioned above, the seal adhesive strength is improved in the panel corner portion.

<Seal Line Width Stabilizing Structure>

Figure 7A:
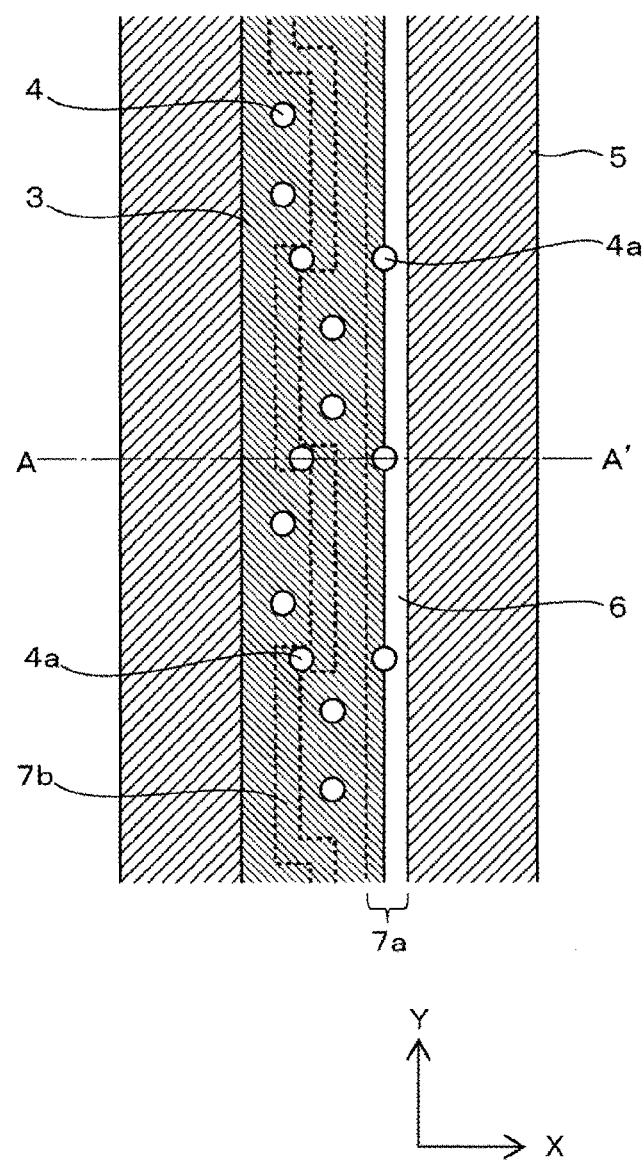
FIG. 7A is a top plan view of the portion indicated by the dotted line C of FIG. 1A in a display device with dummy column spacers added to the display device according to the pattern 2.
Figure 7B:
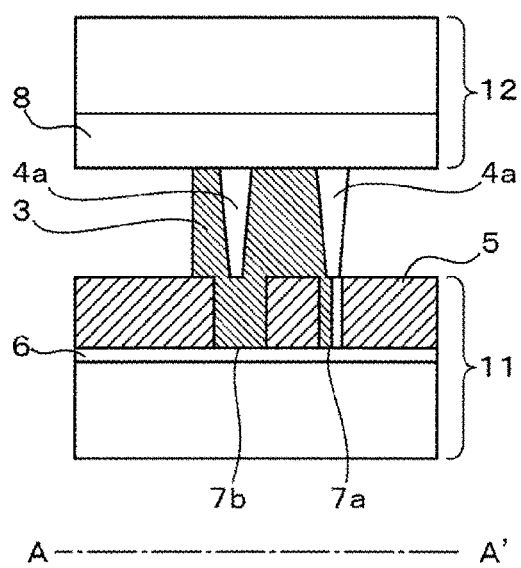
FIG. 7B is a cross sectional view taken along the line A-A' of FIG. 7A.

FIG. 7A is a top plan view of the portion indicated by the dotted line C of FIG. 1A in a display device with a dummy column spacer added to the display device according to the pattern 2. FIG. 7B is a cross sectional view taken along the line A-A' of FIG. 7A.

Different from the groove formed only in the parallel direction to the longitudinal direction of the seal 3 in the pattern 1, the groove is formed in the vertical direction in the pattern 2 to the pattern 4; therefore, the groove capacity per unit length becomes various depending on the seal forming position and the seal storing capacity becomes various, with a fear of hardly stabilizing the seal line width. In order to cope with this problem, it is preferable that when forming the column spacers according to the photolithography, dummy column spacers 4a are provided also in the groove in the resin layer 5, as illustrated in FIGS. 7A and 7B. FIGS. 7A and 7B have the same structure as FIGS. 4A and 4B except that the column spacers 4a are added to the pattern 2 of FIGS. 4A and 4B. The column spacers 4a may be added to the pattern 3 and the pattern 4. The column spacers 4a provided in the groove do not support the upper and lower substrates or do not help cell gap formation. Since the column spacers 4a are formed according to the photolithography technique, they can be designed with some degree of freedom in their shape and size depending on the groove shape and width, to relieve a deviation of the sealing material storing capacity in the groove.

Three patterns (pattern 1-S, pattern 2-S, and pattern 3-S) in the seal straight portion may be respectively combined with two patterns (pattern 1-C and pattern 4-C) in the seal corner portion. In other words, six patterns are formed according to the combinations. The column spacers may be provided in the array substrate and the groove may be provided in a black matrix film and a flattening film formed on the opposite substrate.

What is claimed is:

1. A display device comprising:
a first substrate including a resin layer;
a second substrate; and
a seal area for arranging a sealing material of sticking the first substrate and the second substrate,
wherein the seal area is arranged around an outer periphery of the first substrate,
the resin layer includes
a first groove, in an area overlapping with the seal area, and
a second groove arranged at an outer peripheral side from the first groove, and
each longitudinal direction of the first groove and the second groove is in parallel to the outer periphery,
wherein the resin layer is provided with a fourth groove in an area overlapping with the curved seal area, and
the fourth groove is formed in a shape curved convexly toward a center of the first substrate in a plan view.

2. The display device according to claim 1,
wherein the second substrate is provided with a first column spacer in an area overlapping with the seal area, and
the first column spacer is arranged in an area other than above the first and the second grooves.

3. The display device according to claim 1,
wherein the second substrate is provided with a second column spacer in an area overlapping with the seal area, and
the second column spacer is arranged above the first and the second grooves.

4. The display device according to claim 1,
wherein the resin layer is provided with a third groove between the first groove and the second groove,
the longitudinal direction of the third groove is in parallel to the outer periphery, and
the third groove is designed as crank shaped and having a continuous direction segment vertical to the longitudinal direction parallel to the outer periphery.

5. The display device according to claim 1,
wherein the first substrate is an array substrate and the second substrate is an opposite substrate.

6. The device according to claim 1,
wherein a liquid crystal layer is interposed between the first substrate and the second substrate.

7. A display device comprising:
a first substrate including a resin layer;
a second substrate; and
a seal area for arranging a sealing material of sticking the first substrate and the second substrate,
wherein the seal area is arranged around an outer periphery of the first substrate,
the resin layer is provided with a first groove in an area overlapping with the seal area, and
the first groove is designed as crank shape to have continuous direction segments parallel to and vertical to the longitudinal direction parallel to the outer periphery,
wherein the resin layer is provided with a fourth groove in the area overlapping with the curved seal area, and
the fourth groove is formed in a shape curved convexly toward a center of the first substrate in a plan view.

8. The display device according to claim 7,
wherein the resin layer is provided with a second groove arranged at the outer peripheral side from the first groove in the area overlapping with the seal area, and
the longitudinal direction of the second groove is in parallel to the outer periphery.

9. The display device according to claim 7,
wherein the resin layer is provided with a third groove arranged at the outer peripheral side from the first groove in the area overlapping with the seal area,
the longitudinal direction of the third groove is in parallel to the outer periphery, and
the third groove is designed as crank shaped and having a continuous direction segment vertical to the longitudinal direction parallel to the outer periphery.

10. The display device according to claim 7,
wherein the second substrate is provided with a first column spacer in the area overlapping with the seal area, and
the first column spacer is arranged in an area other than above the first and the second grooves.

11. The display device according to claim 7,
wherein the second substrate is provided with a second column spacer in the area overlapping with the seal area, and
the second column spacer is arranged above the first and the second grooves.

12. The display device according to claim 7,
wherein the first substrate is an array substrate and the second substrate is an opposite substrate.

13. The display device according to claim 7,
wherein a liquid crystal layer is interposed between the first substrate and the second substrate.

* * * * *